(12) United States Patent
Doughty et al.

(10) Patent No.: US 7,363,264 B1
(45) Date of Patent: Apr. 22, 2008

(54) PROCESSING BUSINESS TRANSACTIONS USING DYNAMIC DATABASE PACKAGESET SWITCHING

(75) Inventors: Steven G. Doughty, Plano, TX (US); Charles P. Bobbitt, Plano, TX (US)

(73) Assignee: Computer Sciences Corporation, Austin, TX (US)

(*) Notice: Subject to any disclaimer, the term of this patent is extended or adjusted under 35 U.S.C. 154(b) by 1175 days.

(21) Appl. No.: 09/699,058

(22) Filed: Oct. 27, 2000

Related U.S. Application Data

(60) Provisional application No. 60/162,708, filed on Oct. 29, 1999.

(51) Int. Cl.
*G06Q 40/00* (2006.01)
*G06F 7/00* (2006.01)

(52) U.S. Cl. .............................. 705/35; 705/36; 705/38; 705/39; 707/6; 707/7; 707/101; 707/102

(58) Field of Classification Search .................... 707/6, 707/7, 101, 102, 103 Y, 204, 1; 705/35–36, 705/38, 39–45, 1
See application file for complete search history.

(56) References Cited

U.S. PATENT DOCUMENTS

| | | | |
|---|---|---|---|
| 4,606,002 A | | 8/1986 | Waisman et al. |
| 4,878,167 A | | 10/1989 | Kapulka et al. |
| 5,099,422 A | | 3/1992 | Foresman et al. |
| 5,191,522 A | | 3/1993 | Bosco et al. |
| 5,201,044 A | | 4/1993 | Frey, Jr. et al. |
| 5,233,513 A | | 8/1993 | Doyle |
| 5,257,366 A | * | 10/1993 | Adair et al. .................... 707/4 |
| 5,386,566 A | | 1/1995 | Hamanaka et al. |
| 5,394,555 A | | 2/1995 | Hunter et al. |

(Continued)

FOREIGN PATENT DOCUMENTS

EP   0 280 773   9/1988

(Continued)

OTHER PUBLICATIONS

"@ Fault A Commitment to Consistency," Computer Sciences Corporation, Copyright 2000, pp. 1-2.

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A system and method for dynamic selection of a database identifier based on application program requirements in a Financial Service Organization (FSO) business transaction processing system. Developers may build application programs for FSO business transactions with increased flexibility to changing business requirements and reduced development time. Dynamic database packageset software may provide functionality to isolate the FSO application program source code from changes to the FSO database. A dynamic database packageset switching table may include user defined keys and their associated database identifier values. The dynamic database packageset switching software may provide functionality to build a key, in real-time with a pre-defined structure, based on application program parameter values, use the key to access the dynamic database packageset switching table to locate an associated database identifier and access an FSO database using the database identifier to retrieve requested FSO data.

15 Claims, 16 Drawing Sheets

U.S. PATENT DOCUMENTS

| | | | |
|---|---|---|---|
| 5,421,011 | A | 5/1995 | Camillone et al. |
| 5,434,994 | A | 7/1995 | Shaheen et al. |
| 5,455,947 | A | 10/1995 | Suzuki et al. |
| 5,483,632 | A | 1/1996 | Kuwamoto et al. |
| 5,499,330 | A | 3/1996 | Lucas et al. |
| 5,504,674 | A | 4/1996 | Chen et al. |
| 5,513,348 | A | 4/1996 | Ryu et al. |
| 5,523,942 | A | 6/1996 | Tyler et al. |
| 5,524,205 | A | 6/1996 | Lomet et al. |
| 5,550,976 | A | 8/1996 | Henderson et al. |
| 5,586,310 | A | 12/1996 | Sharman |
| 5,615,309 | A | 3/1997 | Bezek et al. |
| 5,638,508 | A | 6/1997 | Kanai et al. |
| 5,689,706 | A | 11/1997 | Rao et al. |
| 5,710,915 | A | 1/1998 | McElhiney |
| 5,721,915 | A * | 2/1998 | Sockut et al. ............... 707/200 |
| 5,732,397 | A | 3/1998 | De Tore et al. |
| 5,742,820 | A | 4/1998 | Perlman |
| 5,745,901 | A | 4/1998 | Entner et al. |
| 5,768,505 | A | 6/1998 | Gilchrist et al. |
| 5,768,506 | A | 6/1998 | Randell |
| 5,794,229 | A | 8/1998 | French et al. |
| 5,797,134 | A | 8/1998 | McMillan et al. |
| 5,832,481 | A | 11/1998 | Sheffield |
| 5,864,679 | A | 1/1999 | Kanai et al. |
| 5,867,494 | A | 2/1999 | Krishnaswamy et al. |
| 5,870,711 | A | 2/1999 | Huffman |
| 5,870,725 | A | 2/1999 | Bellinger et al. |
| 5,870,746 | A | 2/1999 | Knutson et al. |
| 5,873,066 | A | 2/1999 | Underwood et al. |
| 5,881,379 | A | 3/1999 | Beier et al. |
| 5,892,905 | A | 4/1999 | Brandt et al. |
| 5,907,848 | A | 5/1999 | Zaiken et al. |
| 5,909,683 | A | 6/1999 | Miginiac et al. |
| 5,930,759 | A | 7/1999 | Moore et al. |
| 5,933,816 | A | 8/1999 | Zeanah et al. |
| 5,937,189 | A | 8/1999 | Branson et al. |
| 5,940,809 | A | 8/1999 | Musmanno et al. |
| 5,950,169 | A | 9/1999 | Borghesi et al. |
| 5,950,192 | A | 9/1999 | Moore et al. |
| 5,956,719 | A | 9/1999 | Kudo et al. |
| 5,987,434 | A | 11/1999 | Libman |
| 5,991,733 | A | 11/1999 | Aleia et al. |
| 5,991,756 | A | 11/1999 | Wu |
| 5,995,971 | A | 11/1999 | Douceur et al. |
| 6,003,033 | A | 12/1999 | Amano et al. |
| 6,038,393 | A | 3/2000 | Iyengar et al. |
| 6,049,665 | A | 4/2000 | Branson et al. |
| 6,064,983 | A | 5/2000 | Koehler |
| 6,075,851 | A | 6/2000 | Pinard et al. |
| 6,081,832 | A | 6/2000 | Gilchrist et al. |
| 6,092,049 | A | 7/2000 | Chislenko et al. |
| 6,105,007 | A | 8/2000 | Norris |
| 6,112,209 | A | 8/2000 | Gusack |
| 6,115,690 | A | 9/2000 | Wong |
| 6,134,582 | A | 10/2000 | Kennedy |
| 6,163,770 | A | 12/2000 | Gamble et al. |
| 6,185,540 | B1 | 2/2001 | Schreitmueller et al. |
| 6,202,070 | B1 | 3/2001 | Nguyen et al. |
| 6,226,623 | B1 | 5/2001 | Schein et al. |
| 6,236,975 | B1 | 5/2001 | Boe et al. |
| 6,272,482 | B1 | 8/2001 | McKee et al. |
| 6,289,339 | B1 * | 9/2001 | Weber ............................ 707/4 |
| 6,336,096 | B1 | 1/2002 | Jernberg |
| 6,341,287 | B1 | 1/2002 | Sziklai et al. |
| 6,385,612 | B1 | 5/2002 | Troisi |
| 6,393,386 | B1 | 5/2002 | Zager et al. |
| 6,438,563 | B1 * | 8/2002 | Kawagoe ..................... 707/201 |
| 6,442,533 | B1 | 8/2002 | Hinkle |
| 6,446,086 | B1 | 9/2002 | Bartlett et al. |
| 6,473,740 | B2 | 10/2002 | Cockrill et al. |
| 6,557,752 | B1 | 5/2003 | Yacoob |
| 6,662,164 | B1 | 12/2003 | Koppelman et al. |
| 6,970,844 | B1 | 11/2005 | Bierenbaum |

FOREIGN PATENT DOCUMENTS

| | | |
|---|---|---|
| EP | 0 465 018 | 1/1992 |
| EP | 0 836 779 | 4/1998 |
| EP | 0 926 608 | 6/1999 |
| JP | 11312166 A * | 4/1998 |

OTHER PUBLICATIONS

Merlin, Jr., William F., "Colossus: What We Know Today," The Merlin Law Group, Aug. 2000, Tampa, FL, pp. 1-8.

Merlin, Jr., William F., "Collision Course With The Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, Mar. 2000, Tampa, FL, pp. 1-31.

Mead, Jay, Technical Communication, Aug. 1998, V. 45, N.3, p. 353-380.

Scopus Introduces World's Most Complete Call Center Solution for Financial Services; PR Newswire dated Nov. 5, 1997.

Borland, Russel; "Running Microsoft Outlook 97", Microsoft Press, 1997.

Juhl, Randy P., "The OTC Revolution"; Drugtopics.com; Mar. 3, 1997, pp. 1-9.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.

Continuum Connections to the Americas, vol. 2, No. 4, The Continuum Company, Inc., Jul. 1996, 55 pages.

Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.

Connections to the Americas, vol. 3, No. 2, CSC Continuum, Feb. 1997, 55 pages.

Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/ US 00/18016, mailed Nov. 10, 2000.
International search report application No. PCT/ US 00/18020 mailed Nov. 10, 2000.

* cited by examiner

132 — 134 —

130

| AVAILABLE KEY ELEMENTS | USEABLE IN KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

| AVAILABLE KEY ELEMENTS | USE AS KEY FIELD? | SEQUENCE |
|---|---|---|
| V | NO | N/A |
| W | YES | 2 |
| X | YES | 1 |
| Y | NO | N/A |
| Z | YES | 3 |

FIGURE 12

| 152 | 154 | 156 | 158 | 160 |
|---|---|---|---|---|
| KEY FIELD | FIELD SEQUENCE | ELEMENT NAME | FIELD LENGTH | FIELD TYPE |
| X | 1 | COMPANY ID | 2 | NUMERIC |
| W | 2 | CREDIT CARD TYPE | 3 | CHARACTER |
| Z | 3 | ON US/NOT ON US | 1 | CHARACTER |

| ROW (172) | KEY VALUES (174) | | | PACKAGESET SWITCHING TABLE VALUES (178) |
|---|---|---|---|---|
| | X | W | Z | DATABASE IDENTIFIER VALUE |
| 1 | 12 | VIS | Y | NN1234567890123456 |
| 2 | 12 | DIS | Y | NN1234567890123457 |
| 3 | 12 | * | * | NN1234567890123458 |
| 4 | 12 | * | Y | NN1234567890123459 |
| 5 | 14 | VIS | N | NN1234567890123460 |
| 6 | 14 | DIS | N | NN1234567890123461 |
| 7 | * | * | * | NN1234567890123462 |

PROCESSING BUSINESS TRANSACTIONS USING DYNAMIC DATABASE PACKAGESET SWITCHING

PRIORITY CLAIM

This application claims the benefit of U.S. Provisional Application No. 60/162,708 entitled "Processing Business Transactions Using Dynamic Database Packageset Switching," filed Oct. 29, 1999.

BACKGROUND OF THE INVENTION

1. Field of the Invention

The present invention generally relates to computer software programs and databases to be used in Financial Service Organizations. More particularly, the present invention relates to the dynamic selection of a database identifier, associated with a database, based on application program requirements in a Financial Service Organization (FSO) business transaction processing system.

2. Description of the Related Art

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used. A database packageset contains information needed by the FSO database software to locate and access data in the most efficient way for a particular application program in the FSO business transaction processing system. Database packageset switching occurs when the database packageset values associated with one application program are changed to the database packageset values associated with another application program in the same business transaction processing system. Dynamic database packageset switching occurs when the database packageset values associated with one application program are changed in real-time to the database packageset values associated with another application program in the same business transaction processing system. FSO database environmental variables and database registry values may contain information to control a specific database environment within the FSO business transaction processing system. The user may change environmental variables and registry values to change the FSO database environment.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Groups of data such as master files and transactions may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction. Another example of a processing parameter may be a database identifier, which may point to the location of the data in an FSO database.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

A combination of data elements used to determine the value of a processing parameter may be referred to as a key definition for the processing parameter. The combination of data element values constructed from the key definition may be referred to as a key value. For example, a software program for processing credit card transactions for a credit card institution may use the credit card issuer and card type to determine the database identifier.

Key definitions and key value construction are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If more than one FSO use the software programs, customization of key definitions and key value construction for one of the FSOs requires creating and maintaining a customized copy of the source code for the programs.

In some FSO systems, processing parameters, such as the database identifier, and the key values used to identify them may be hardcoded in the source code for the FSO system software programs. Modifying the processing parameters and key values for these systems may involve modifying the source code for all software programs that use the processing parameter, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Thus, the processing parameters and key values in the database may be considered hardcoded as well, as they cannot be modified without also modifying the source code and rebuilding the programs as described above.

During the initial design and development phase of a large scale database application, such as the DB2, it may be necessary or desirable to have different database environments for Development, Quality, Testing, Production, etc. In addition, the Development environment may also be different, based on the operating system of the computer. It may be necessary or desirable to have one or more databases within one environment. For example, it may be desirable to have a separate database for each development engineer within one DB2 Development environment.

Database limitations may prohibit the use of multiple environments within the same database sub-system. The number of multiple databases within one environment within the same database sub-system may also be limited. One embodiment of a database, which may have some of these limitations is the DB2 database from International Business Machines (IBM). These limitations may often substantially reduce the flexibility of the FSO transaction processing application software program to adapt to changing business requirements. For example, an FSO business transaction processing system may need to expand and respond quickly to integrate a newly acquired FSO or process transactions from a new FSO location. A conventional method to implement these changes often involves changing the source code of the application program. This method is programming intensive, time consuming and costly.

The conventional method for the FSO transaction processing application software program developer to work around database environment restriction may be to manually modify the application program source code, in an off-line mode, to change the environment name in the database registry values. The application source code may be written in higher level programming languages such as COBOL, SQL, C, Visual Basic, C++, Java, and others. Manual switching between the one or more database environments may often involve a shutdown and startup phase for the database sub-system. This is especially undesirable in installations, which attempt to operate continuously.

The conventional method for the FSO transaction processing application software program developer to avoid the difficulty of adding a new database name may be to add new data to an existing database name. As an alternate, the application software program developer could manually modify the application program source code, in an off-line mode, to change the database name in the DB2 registry values to the 'new' database name. The application source code may be written in higher level programming languages such as COBOL, SQL, C, Visual Basic, C++, Java, and others. Both of these methods have drawbacks.

The method of adding new data to an existing DB2 database increases the size, often reducing the system performance and increasing maintenance complexity. The method of changing a database name by using applicable commands in the application programming language i.e. by modifying the source code, significantly increases the development time and the costs. For example, adding a new company database in an FSO may affect the source code in thousands of application programs.

SUMMARY OF THE INVENTION

The present invention provides various embodiments of an improved method and system for dynamically selecting a database packageset table entry based on application program requirements. In some embodiments, data may be stored in tables in the database. In one embodiment, a key definition table, database packageset table for storing database identifier values and key values may be provided.

In one embodiment, a key definition may be configured for use in building a processing key value from data associated with an FSO customer transaction in response to a computer program executing on the FSO computer system requesting a processing parameter value to be used in the processing of the FSO customer transaction. The processing key value may be used in locating the database identifier value in a dynamic database packageset table in the FSO computer system database. The key definition may also be used during the comparison of processing key values to pre-configured key values stored in a database packageset table. If a pre-configured key value that matches the processing key value is found in the dynamic database packageset table, a database identifier value stored with the pre-configured key value in the database packageset table may be returned to the requesting computer program.

The key definition may include one or more data elements, or key elements. The key elements may be arranged in a sequence in the key definition. The key elements may include information describing the location and data format of data element values in the FSO system database. The location information in a key element may be used in locating a data element value in the database during the building of a processing key value, wherein the data element value is to be included as part of the processing key value. The data format information may be used to specify the data type, size and other data attributes during the building of a processing key value. The key definition may be stored in the database in the FSO system. In one embodiment, the key definition may be stored in a key definition table in the database.

Processing parameter values may be configured for use during the processing of data, including FSO transactions, in the FSO computer system. Key values may be configured for use in locating the processing parameters in the FSO computer system. In one embodiment, database identifier values and user defined key values may be stored in a dynamic database packageset table in the database, with one row in the dynamic database packageset table including one or more fields for storing a key value and one or more fields for storing processing parameter values associated with the key value. In one embodiment, a key definition may be used to format the user interface for entering key element values. A key element value may be entered for each key element in the key definition, and the key element values may be combined to construct a key value.

In one embodiment of a system for processing business data in an FSO transaction processing computer system using user-configured key definitions, a key building program may be provided. The key building program may be configured to accept requests for processing parameters from FSO transaction processing programs executing on the FSO computer system. The key building program may be configured to access a key definition table in the FSO system database and to read a key definition for a processing parameter in response to receiving a request for the processing parameter.

A key building program may be configured to build a processing key value for a processing parameter from one or more data element values in the FSO system database in response to receiving a request for the processing parameter. In one embodiment, the key building program may be configured to locate data element values in the FSO system database using data element location information stored in the a key definition. In one embodiment, each of one or more key elements in a key definition may specify the location and data format of one data element in the FSO system database. The key building program may be configured to use the data element information stored in the key elements of the key definition to locate data elements in the FSO system database and to read the data element values from the FSO system database. The key building program may be configured to write each data element value read from the FSO system database to a corresponding key element in a processing key. In one embodiment, the key element values in the processing key may be in combination referred to as the processing key value.

In one embodiment of a system for processing business data in an FSO transaction processing computer system using dynamic database packageset switching, a dynamic database packageset switching software program may be provided. In one embodiment, the program may be configured to receive processing key values from a key building program. The dynamic database packageset switching software program may be configured to locate a dynamic database packageset switching table for locating a database identifier in the FSO system database in response to receiving a data value request from the application program. In one embodiment, the dynamic database packageset switching software program may compare the processing key value to the pre-configured key values stored in the rows of the dynamic database packageset switching table.

In one embodiment, the dynamic database packageset switching program may be configured to send a message to the application program in response to the dynamic database packageset switching program not finding a match for the processing key value among the pre-configured key values in the dynamic database packageset switching table for the database identifier. The message may inform the application program that no match was found for the processing key value submitted to the dynamic database packageset switching program.

In one embodiment, the key definitions, key values, processing parameter values, and database identifier values may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and database identifiers constructed during the initial configuration may be modified or deleted, and new key definitions, key values, processing parameter values, and database identifiers may be added to the FSO system.

BRIEF DESCRIPTION OF THE DRAWINGS

FIG. 7b is a continuation of flowchart in FIG. 7a;

FIG. 11 illustrates one embodiment of a method for selecting key elements to be available for inclusion in a particular key definition from a list of key elements available for inclusion in all key definitions;

FIG. 12 illustrates one embodiment of a method for selecting key elements for inclusion in a key definition from a list of key elements available for inclusion in the key definition;

FIG. 13 illustrates one embodiment of a key definition with examples of parameters that may be included in the key element definitions;

FIG. 14 illustrates one embodiment of a dynamic database packageset switching table for the key definition of FIG. 13 with examples of key values and processing parameter values.

Figure 1:
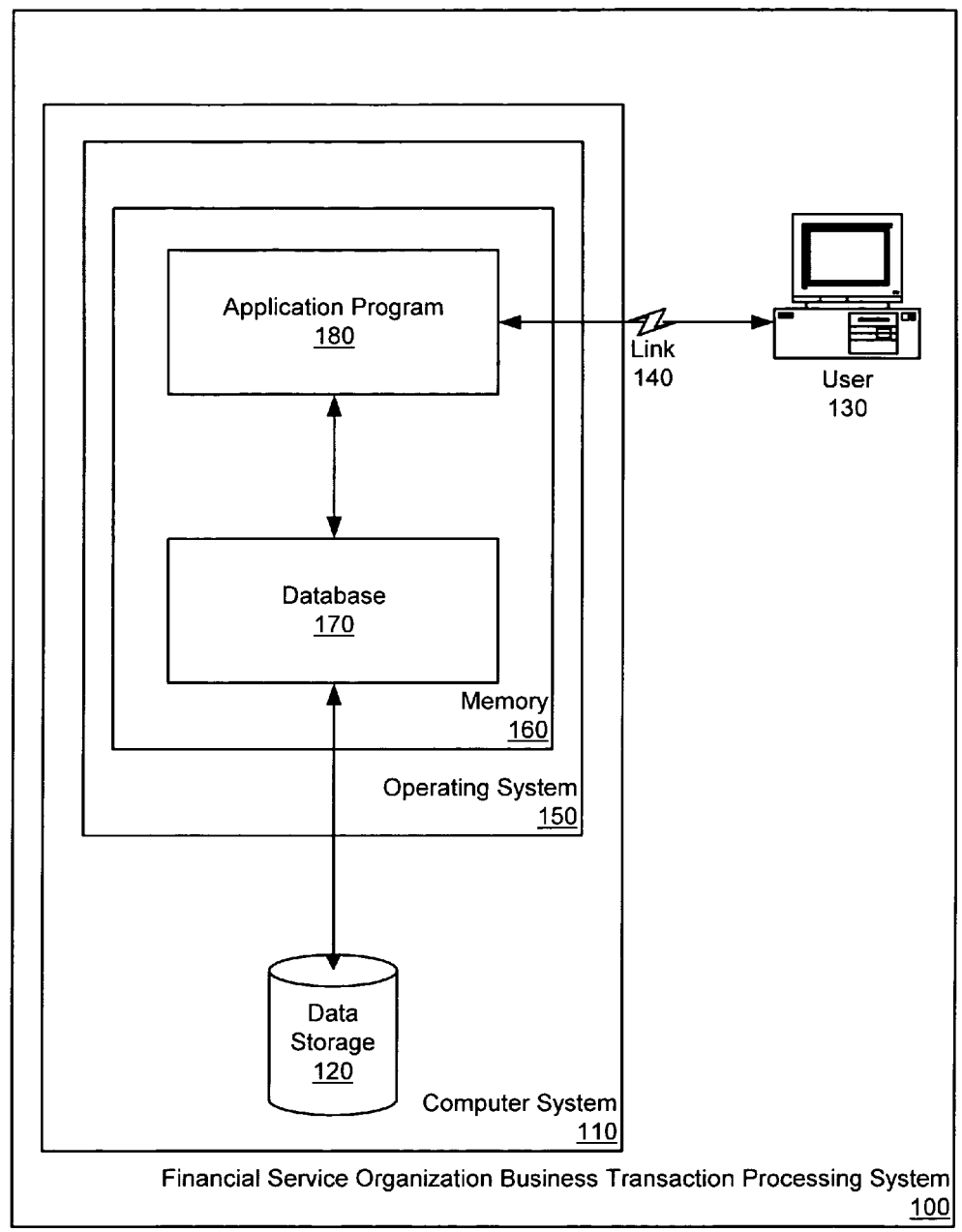
FIG. 1 is a block diagram illustrating the architecture of one embodiment of a financial service organization business transaction processing system with an application program, a database sub-system, a data storage sub-system and a user sub-system in the network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for a dynamic database packageset switching method in a financial service organization business transaction processing system as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system such as MVS available from International Business Machines (IBM) Corporation, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

FIG. 1—A Block Diagram Illustrating a Prior Art Financial Service Organization Business Transaction Processing System In FIG. 1, an embodiment of a prior art financial service organization business transaction processing system 100 may include a computer system 110, an operating system 150, a user display screen 130 connected to the computer system via a link 140, and a database 170 residing on data storage 120. Computer system 110 includes memory 160 configured to store computer programs for execution on system 100, and a central processing unit (not shown) configured to execute instructions of computer programs residing on system 100. Application program 180 may be stored in memory 160. Database access requests generated by the Application program 180 are processed by the FSO database 170. If requested FSO data is available within the FSO database 170 then it retrieves the requested FSO data from the data storage 120. If requested FSO data is not available within the FSO database 170 then it may send an error message to the Application program 180. The user working at a display screen 130 may need to change the Application program 180 source code to eliminate the FSO database 170 error.

Figure 2:
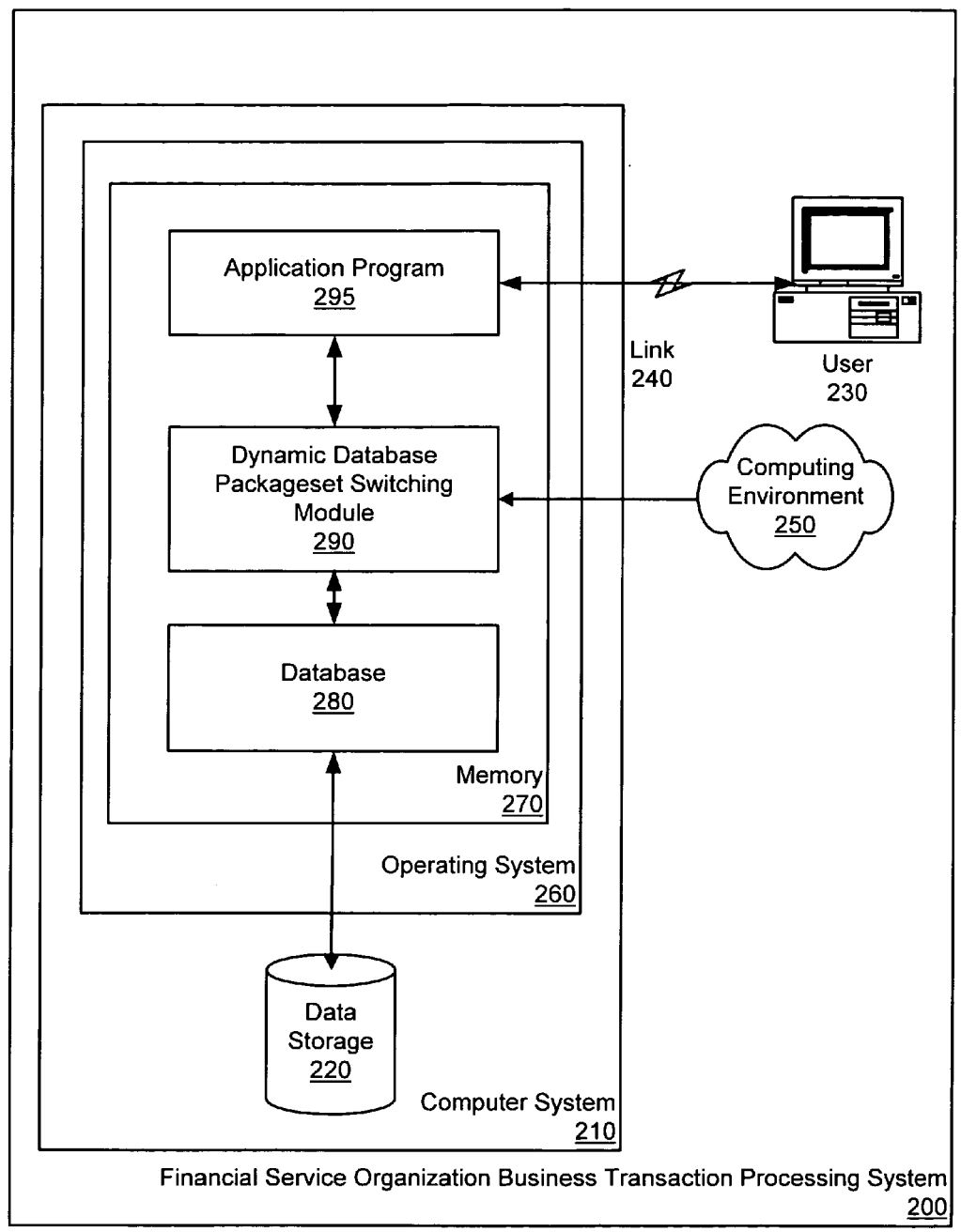
FIG. 2 is a block diagram illustrating the architecture of one embodiment of a financial service organization business transaction processing system with an application program, a dynamic database packageset switching sub-system, a computing environment monitoring sub-system, a database sub-system, a data storage sub-system, and a user sub-system in the network.
Figure 2A:
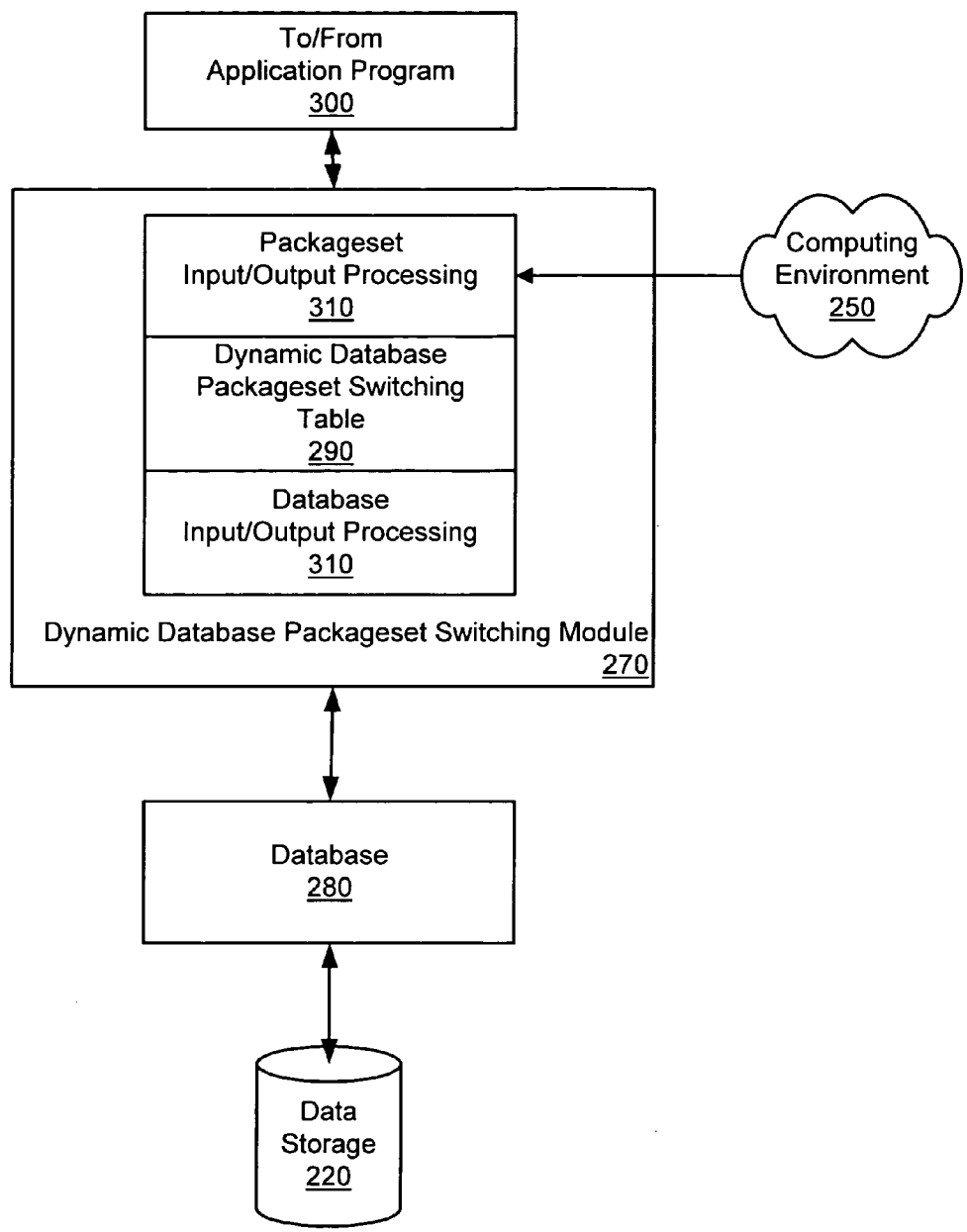
FIG. 2a is a block diagram illustrating one embodiment of a dynamic database packageset switching module, a packageset input/output processing sub-system, a dynamic database packageset switching table, a database input/output processing sub-system, a computing environment monitoring sub-system, a database sub-system, a data storage sub-system.

FIG. 2—A Block Diagram Illustrating One Embodiment of a Financial Service Organization Business Transaction Processing System Utilizing a Dynamic Database Packageset Switching Method In FIG. 2, an embodiment of a financial service organization business transaction processing system 200, utilizing a dynamic database packageset switching method, may include a computer system 210, an operating system 260, a user display screen 230 connected to the computer system via a link 240, a computing environment monitoring software 250 connected to a dynamic database packageset switching software 290, and a database 280 residing on data storage 220. Computer system 210 includes memory 270 configured to store computer programs for execution on system 200, and a central processing unit (not shown) configured to execute instructions of computer programs residing on system 200. Application program 295 is used to interface to and process financial services organization business transactions requested by a user working at a user display screen 230. Application program 295 may be stored in memory 260.

A user working at display screen 230 may execute a transaction associated with Application program 295. The transaction may need data from FSO database 280. FSO database 280 access requests from the Application program 295 are processed by the dynamic database packageset switching module 290. The dynamic database packageset switching module 290 dynamically selects the packageset name associated with the application program. The packageset specified memory location of the requested FSO data and forwards that information to the FSO database 280. The requested FSO data within the FSO database 280 is then retrieved from the data storage 220.

Figure 3:
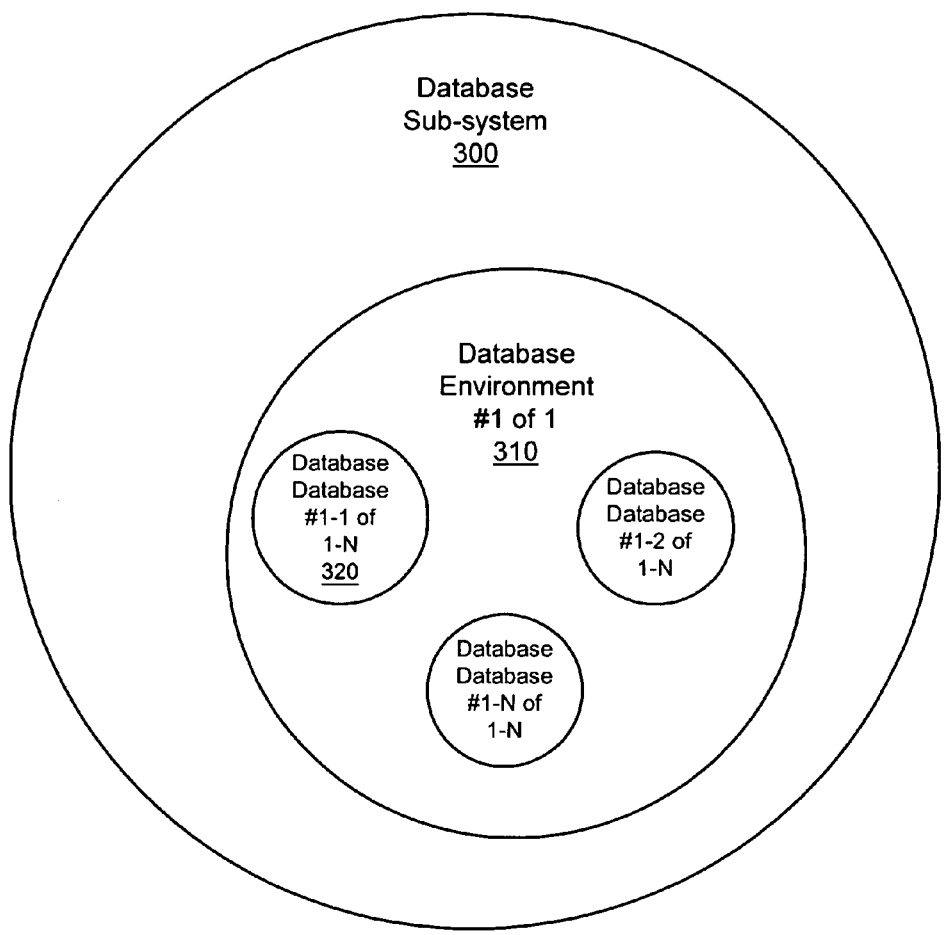
FIG. 3 illustrates a prior art database domain architecture of a financial service organization business transaction processing system with the database domain consisting of a single database sub-system, a single database environment within the database sub-system and one or more databases within the single DB2 database environment.

FIG. 3—A Prior Art Database Domain Architecture of a Financial Service Organization Business Transaction Processing System FIG. 3 illustrates a prior art database domain architecture of a financial service organization business transaction processing system with the database domain consisting of a single database sub-system 300, a single database environment 310 within the database sub-system 300 and one or more databases 320 within the single database environment 310. Prior art database design and set up restrictions normally limit the financial service organization business transaction processing system to use the single environment within the same DB2 sub-system.

Figure 4:
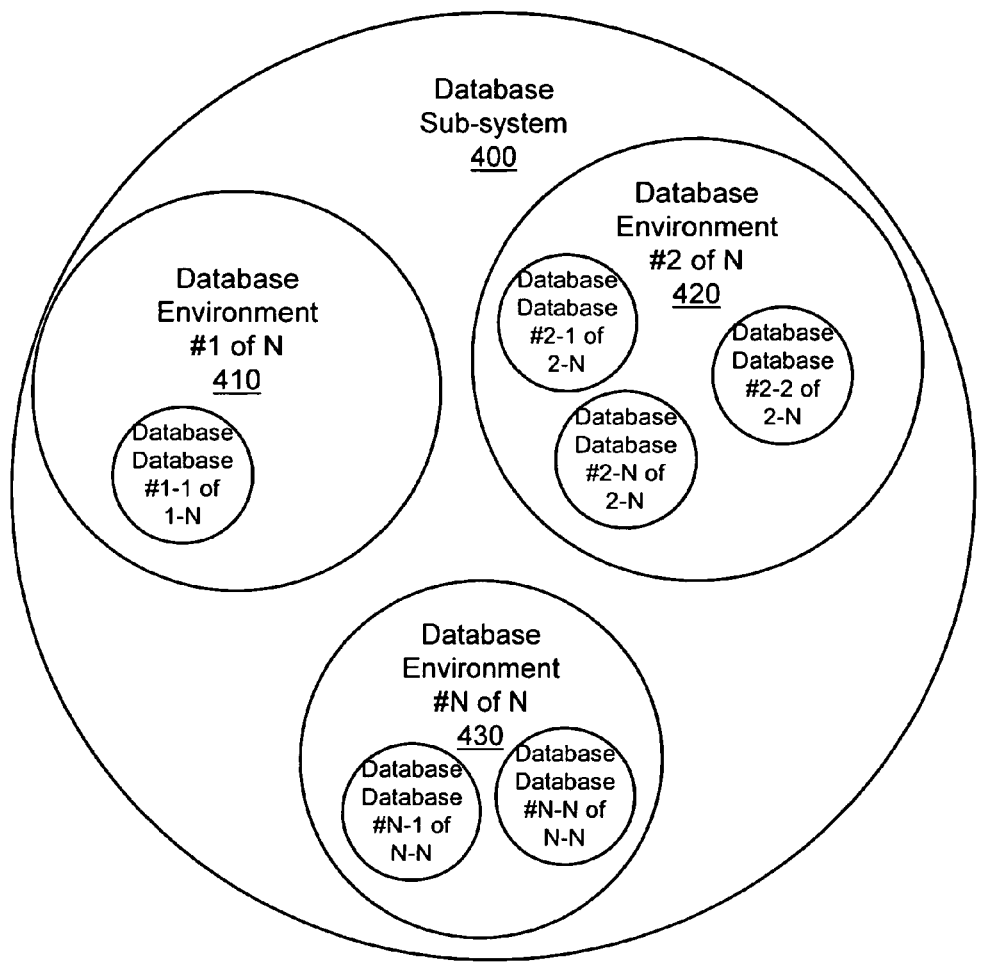
FIG. 4 illustrates a multi-environment, multi-database domain architecture of one embodiment of a financial service organization business transaction processing system with the database domain consisting of a single database sub-system, one or more database environments within the single database sub-system and one or more databases within each of the database environments.

FIG. 4—A Multi-Environment, Multi-Database Domain Architecture of One Embodiment of a Financial Service Organization Business Transaction Processing System FIG. 4 illustrates a multi-environment, multi-database domain architecture of one embodiment of a financial service organization business transaction processing system with a single database sub-system, one or more database environments within the single database sub-system and one or more databases within one of the database environments. The dynamic database packageset switching method and system is capable of processing, at run time, an FSO database access request from the Application Program which would be independent of the current database environment and database name.

Figure 5:
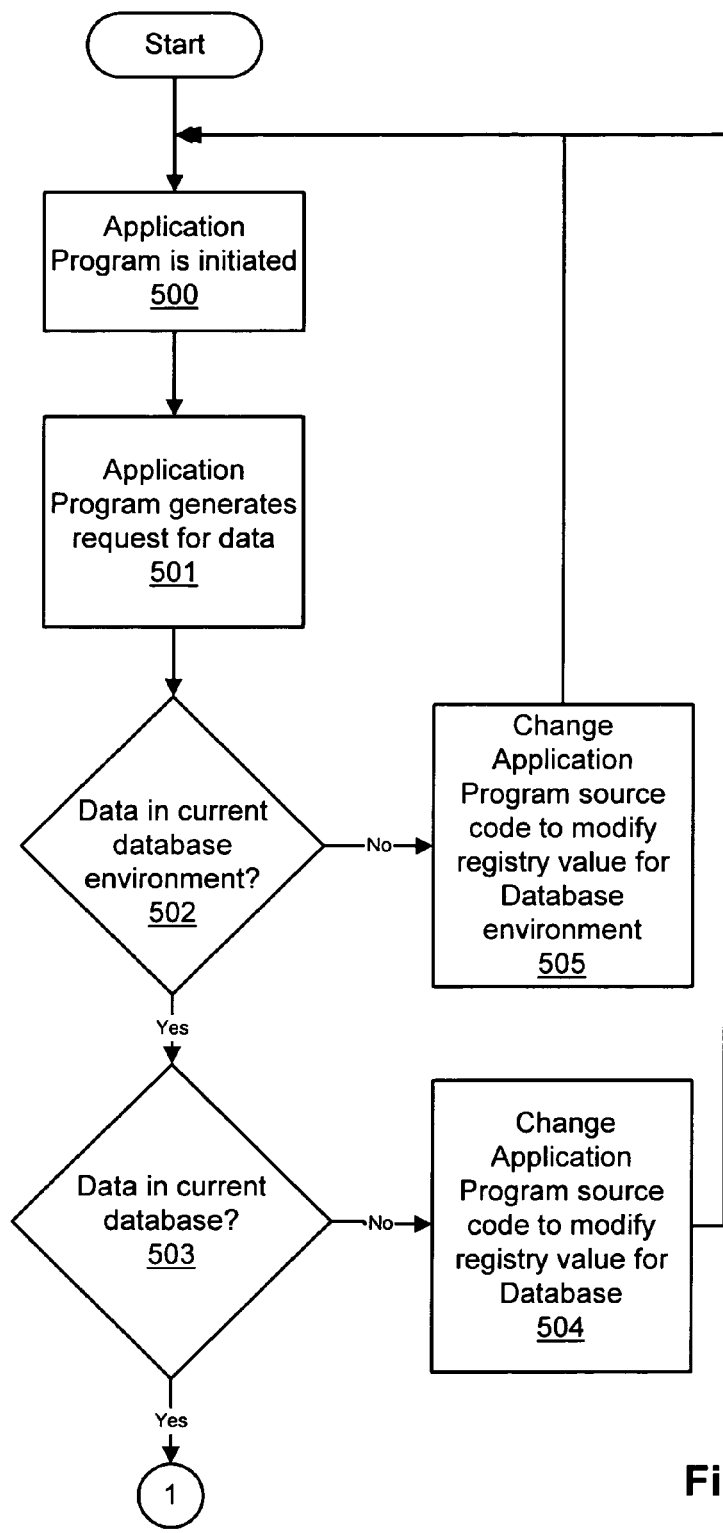
FIG. 5 is a prior art flowchart illustrating the need for modifying application program source code to a change in database environment or an addition of a new database according to one embodiment.

FIG. 5—A Flowchart Illustrating the Prior Art for Processing a Business Transaction which Involves a Change in Database Environment According to One Embodiment;

FIG. 5 is a flowchart illustrating the prior art for processing an FSO business transaction. If the Application Program associated with the business transaction requests data not available in the current database environment or in the current database name then the Application Program source code must be modified. Modifying an application program source code to accommodate a change in database environment or an addition of a new database, according to one embodiment, is time consuming and expensive. In one embodiment, steps 500 through 505 may be performed in a business transaction processing program in the FSO system. The user of the FSO computer may START the prior art FSO processing method by initiating a business transaction. In step 500, the user initiated, or another FSO computer initiated in another embodiment, business transaction may communicate with an application program. In step 501, in response to the user requested business transaction, the application program may generate one or more requests for data from FSO computer database. In step 502, a determination may be made if the requested data is obtainable within the definition of the current environment. If the requested data may be obtained in the current environment then program control is passed to step 503. If the requested data may not be obtained in the current environment then program control is passed to step 505. In step 505, the user of the FSO computer system may need to change the application program source code, in an off-line mode, to modify the environment registry values used in FSO database definition. In step 503, a determination may be made if the requested data is obtainable within the current database name. If the requested data may be obtained in the current database name then program control may be passed to step 510 in FIG. 5a. In step 504, the user of the FSO computer system may need to change the application program source code, in an off-line mode, to modify the database registry values used in FSO database definition.

Figure 5A:
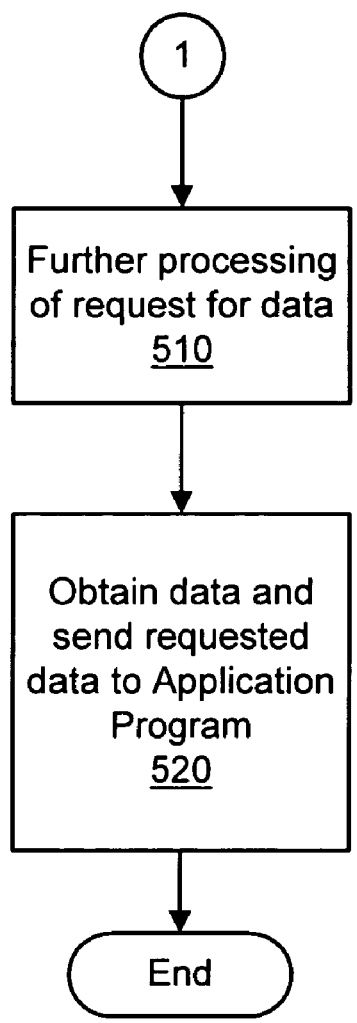
FIG. 5a is a continuation of flowchart in FIG. 5.

FIG. 5a—A Continuation of Flowchart Illustrated in FIG. 5

FIG. 5a is a continuation of flowchart illustrated in FIG. 5. In step 510, in one embodiment, the request for data may be passed on to a database manager in the FSO computer system to locate the requested data. In step 520, in one embodiment, the requested data is retrieved and passed on to the originating application program.

Figure 6:
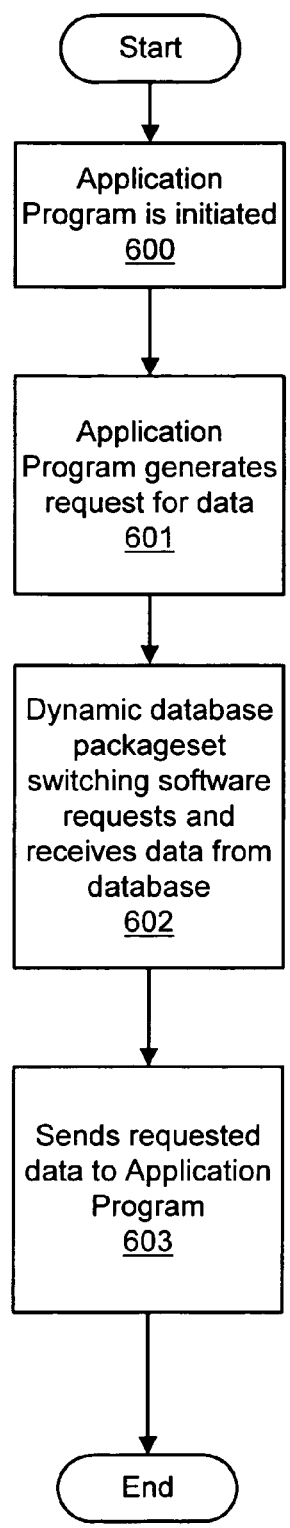
FIG. 6 is a flowchart illustrating the runtime use of dynamic database packageset switching method according to one embodiment.

FIG. 6—A Flowchart Illustrating the Runtime Version of a Dynamic Database Packageset Switching Method According to One Embodiment FIG. 6 is a flowchart illustrating the runtime version of the dynamic database packageset switching method for performing database access during the processing an FSO business transaction. If the Application program associated with the business transaction requests data which may not be available in the current database environment or in the current database name then the dynamic database packageset switching software dynamically changes the environment or the database name without requiring a source code change to access the requested data. In one embodiment, steps 600 and 603 may be performed in a business transaction processing program in the FSO system. The user of the FSO computer may START the dynamic database packageset switching method for performing database access during the processing an FSO business transaction by initiating a business transaction. In step 600, the user requested business transaction may initiate an application program. In step 601, in response to the user requested business transaction, the application program may generate one or more requests for data from the FSO computer database. In step 602, the dynamic database packageset switching method for performing database access may obtain the requested data from the FSO database without changing the application program source code. Further detail of step 602 is shown in FIG. 7b. In step 603, the dynamic database packageset switching method may return the requested data to the application program.

Figure 7A:
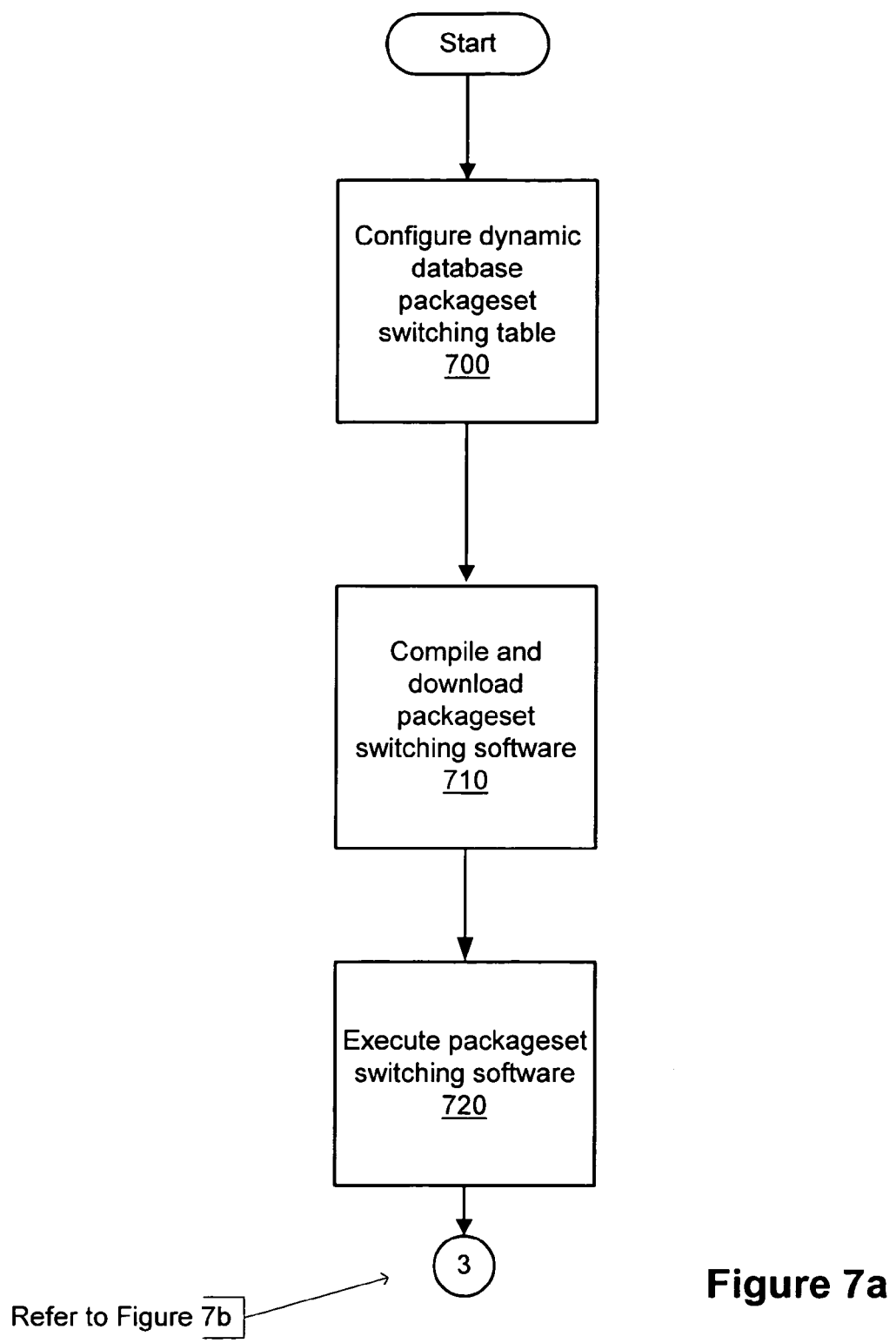
FIG. 7a is a flowchart illustrating the configuration and runtime use of dynamic database packageset switching method according to one embodiment.
Figure 7B:
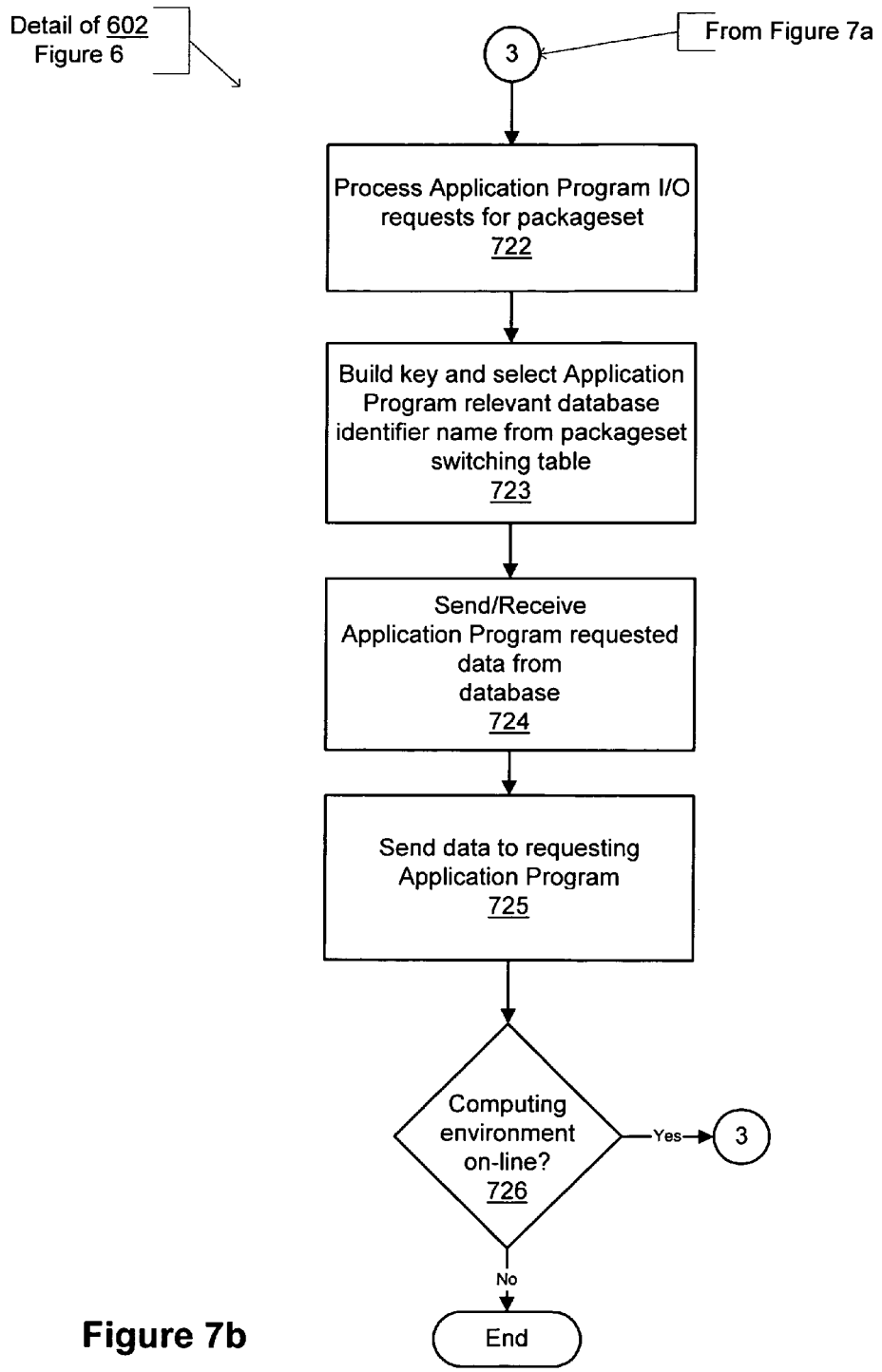

FIG. 7a—A Flowchart Illustrating One Embodiment of the Configuration and Runtime Use of Dynamic Database Packageset Switching Method FIG. 7a is a flowchart illustrating the configuration and runtime version of the dynamic database packageset switching method for performing database access during the processing an FSO business transaction. In one embodiment, steps 700 through 720 may be performed in a business transaction processing program in the FSO system. The user of the FSO computer may START the configuration of the dynamic database packageset switching method by defining values in a dynamic database packageset switching table. In one embodiment, the dynamic database packageset switching table may consist of data values stored in one or more rows and two columns. Column number one may comprise a database identifier and column number two may comprise a user defined key. The user defined key structure may be defined by selecting one or more data dictionary elements arranged in a specific sequence. The database identifier in column number one may comprise a pointer to the FSO computer database location associated with the value of the user defined key in column number two. The dynamic database packageset switching table configuration method is further detailed in FIGS. 11 through 16. In step 710, the dynamic database packageset switching software may be compiled, generated and downloaded. In step 720, the user may execute the dynamic database packageset switching software.

FIG. 7b—A Continuation of Flowchart in FIG. 7a

FIG. 7b is the continuation of flowchart in FIG. 7a. In step 722, the dynamic database switching software receives a request for data stored in the FSO database from the application program. In step 723, the dynamic database switching software program may build a key in real-time, consistent with the user defined key structure defined in step 700. The key may then be used to access the dynamic database switching table to find a database identifier with a matching entry in the user defined key value. In step 724, the dynamic database switching software program may use the database identifier to request data from FSO database. On receiving the requested data from the FSO database, program control may transfer to step 725. The dynamic database switching software program may send the requested data to the application program in step 725. This completes the data request/response cycle for the application program, using the dynamic database switching software program. In step 726, the dynamic database switching software program may constantly monitor if the FSO computer is on-line. If it is on-line, program control transfers to step 722.

Figure 8:
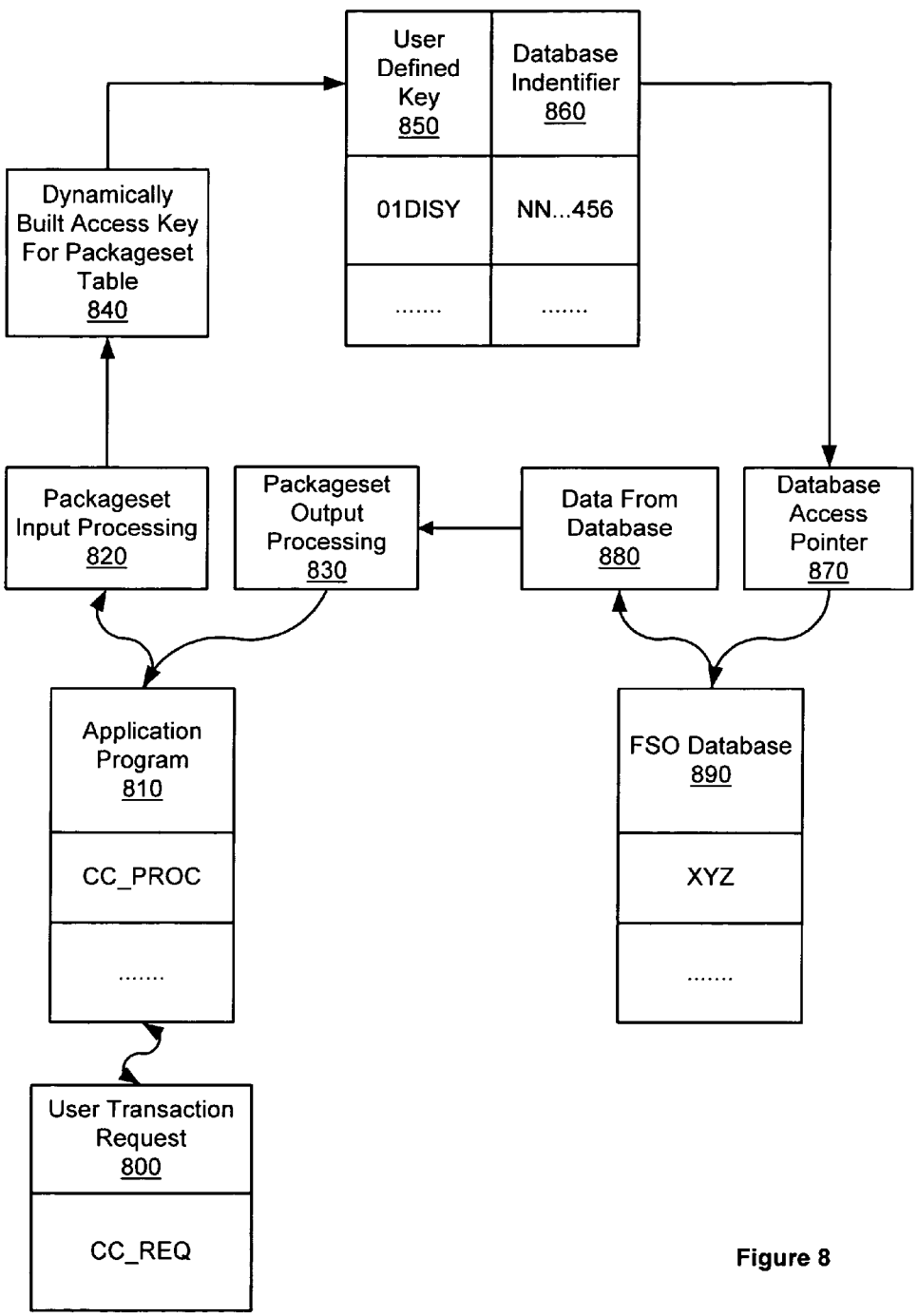
FIG. 8 is a data flow diagram illustrating a dynamic database packageset switching for an associated application program database request according to one embodiment.

FIG. 8—A Data Flow Diagram Illustrating Dynamic Database Packageset Switching for an Associated Application Program Database Request According to One Embodiment FIG. 8 is a data flow diagram illustrating dynamic database packageset switching for an associated application program database request, according to one embodiment. In step 800, a user requests an FSO business transaction. In step 810, an application program associated with the business transaction processes the user request and generates a request for FSO data, which may be required to complete the business transaction, to the dynamic database packageset switching software. In step 820, the input processing portion of the dynamic database packageset switching software may gather additional transaction related information regarding the application program request for FSO data. In one embodiment, this may include the application program name, program variable, location of user and similar other. In step 840, the dynamic database packageset switching software may dynamically create a key to access the dynamic database packageset switching table. In steps 850 and 860, the dynamic database packageset switching software may find a matching user defined key with an associated database identifier. In step 870, the dynamic database packageset switching software may use the database identifier to point to the physical data storage location in the FSO database. In steps 880 and 830, the requested data from FSO database may be returned to the dynamic database packageset switching software which may be passed on to the application program in step 830. The application program may then display requested data to user to complete the user business transaction.

Figure 9:
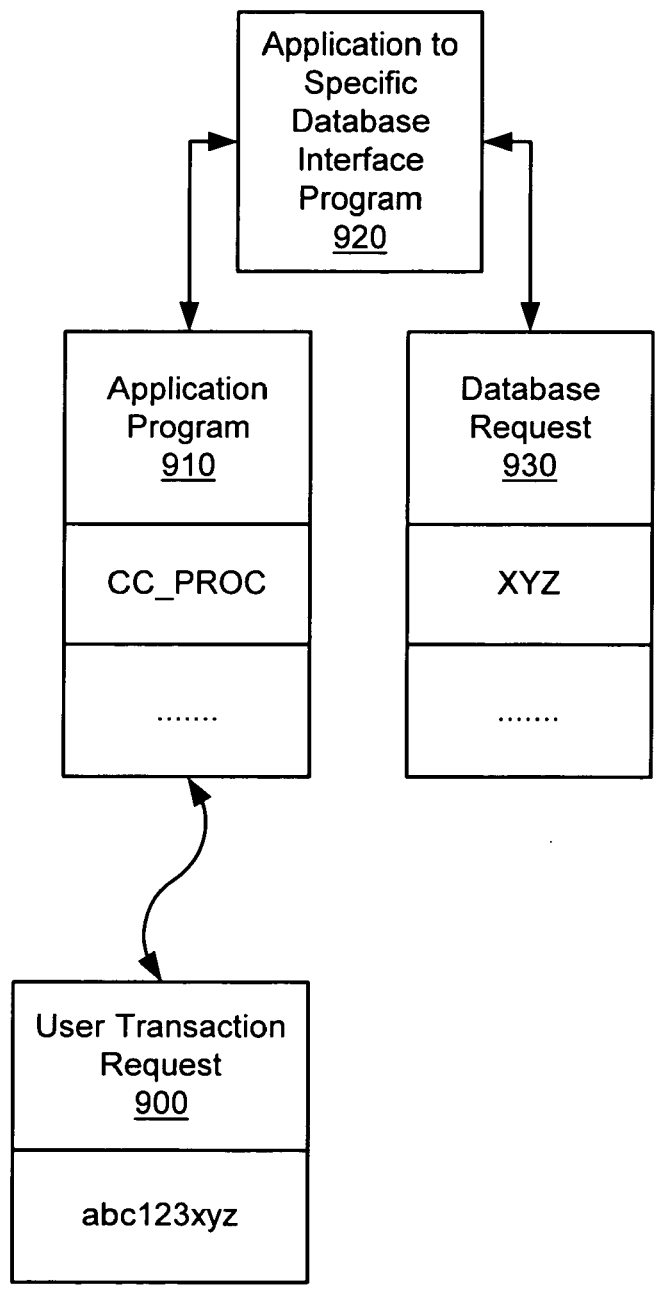
FIG. 9 is a data flow diagram illustrating a legacy method for an application program database request according to one embodiment.

FIG. 9—A Data Flow Diagram Illustrating a Legacy Method for an Application Program Database Request According to One Embodiment FIG. 9 is a data flow diagram illustrating a legacy method for an application program database request, according to one embodiment. In step 900, a user requests an FSO business transaction. In step 910, an application program associated with the business transaction may process the user request and may generate a request for FSO data, which may be required to complete the business transaction. In step 920, the application to specific database interface program may convert the data request to a format understood by the FSO database. In one embodiment, this may include converting the application program data read request written in COBOL to an IBM DB2 database format. In step 930, the requested data from FSO database may be returned to the application to specific database interface program which may be pass on the data to the application program. The application program may then display requested data to user to complete the user business transaction.

Figure 10:
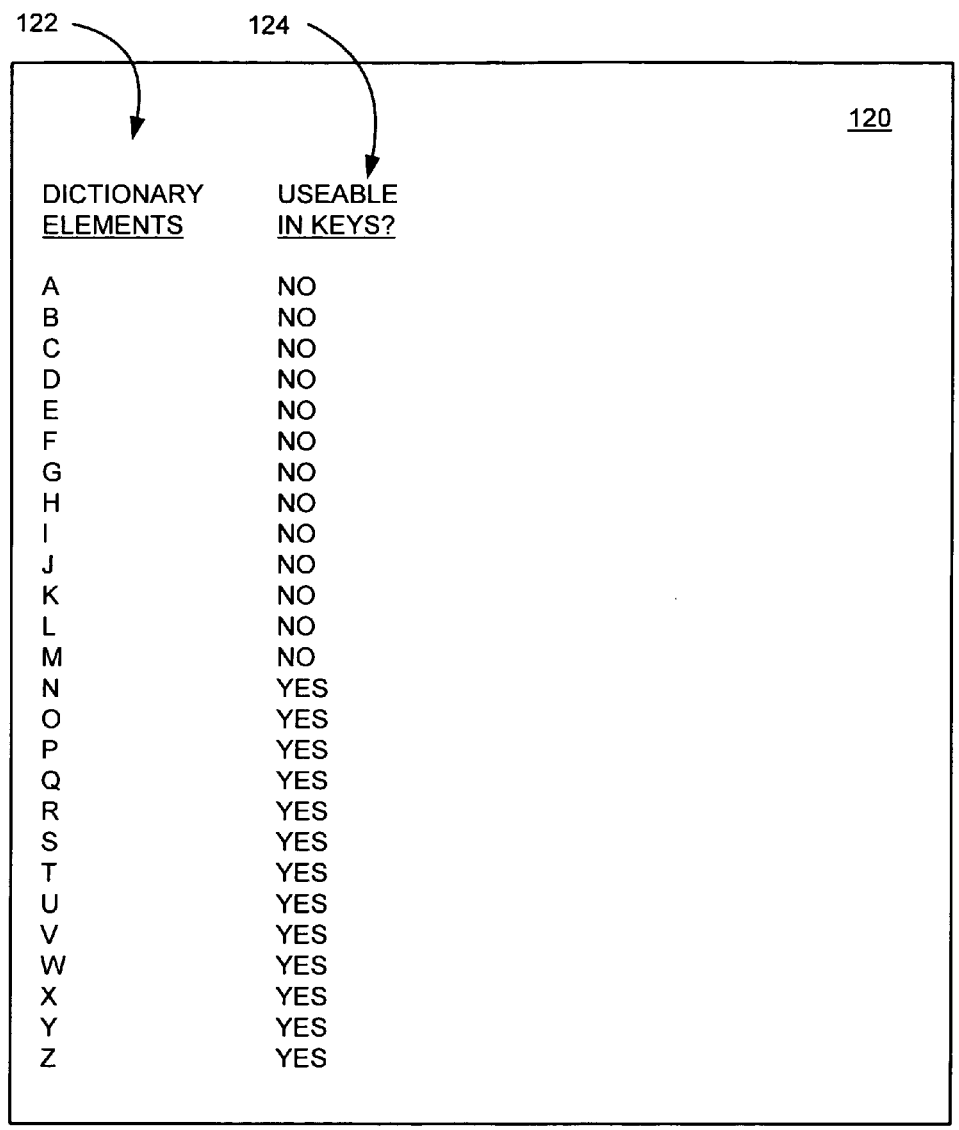
FIG. 10 illustrates one embodiment of a method for selecting data dictionary data elements as key elements available for inclusion in key definitions.

FIG. 10—One Embodiment of a Method for Selecting Data Dictionary Data Elements as Key Elements Available for Inclusion in Key Definitions FIG. 10 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are useable in keys. In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, Y/N, TRUE/FALSE, T/F, 1/0 and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device. In one embodiment, the user may select data dictionary data elements as key elements available for inclusion in key definitions to monitor the FSO computing environment.

FIG. 11—One Embodiment of a Method for Selecting Key Elements to be Available for Inclusion in a Particular Key Definition from a List of Key Elements Available for Inclusion in All Key Definitions FIG. 11 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. 12—One Embodiment of a Method for Selecting Key Elements for Inclusion in a Key Definition from a List of Key Elements Available for Inclusion in the Key Definition FIG. 12 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. 13—One Embodiment of a Key Definition with Examples of Parameters that May be Included in the Key Element Definitions FIG. 13 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-bit bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. 14—One Embodiment of a Dynamic Database Packageset Switching Table for the Key Definition of FIG. 13 with Examples of Key Values and Processing Parameters FIG. 14 illustrates an embodiment of a dynamic database packageset switching table 170 from a database used in an FSO system, with rows including user defined key values 174 and database identifiers 178 associated with the key values. The dynamic database packageset switching table may be used to store user defined key values and the database identifier values associated with the key values. The user defined key values and the database identifier may be entered by a user of the FSO system. In one embodiment, the dynamic database packageset switching table may include pre-defined key values and the database identifier, and the user of the FSO system may add key values and the database identifier to the dynamic database packageset switching table. In one embodiment, the user defined keys may be configured to monitor the FSO computing environment.

The dynamic database packageset switching table may be searched for a particular user defined key value to find the database identifier associated with the key value. In this example, the dynamic database packageset switching table 170 may be used to point to database locations 179 for different key values. The ability for a user of the FSO system to configure key definitions and dynamic database packageset switching tables at configuration time allows the FSO application programs to look up database location for data in a particular transaction based upon attributes of the transaction. For example, an FSO may add a new city branch 175 to process business transactions for Location 14. The user may include one or more attributes (data elements) of the transaction as key elements in the key definition and define a database pointer 179. In this example, the FSO may be able to add new locations, such as adding Location 14, and process business transactions by merely configuring the dynamic database packageset switching table 170 and without changing any application program source code.

Figure 15:
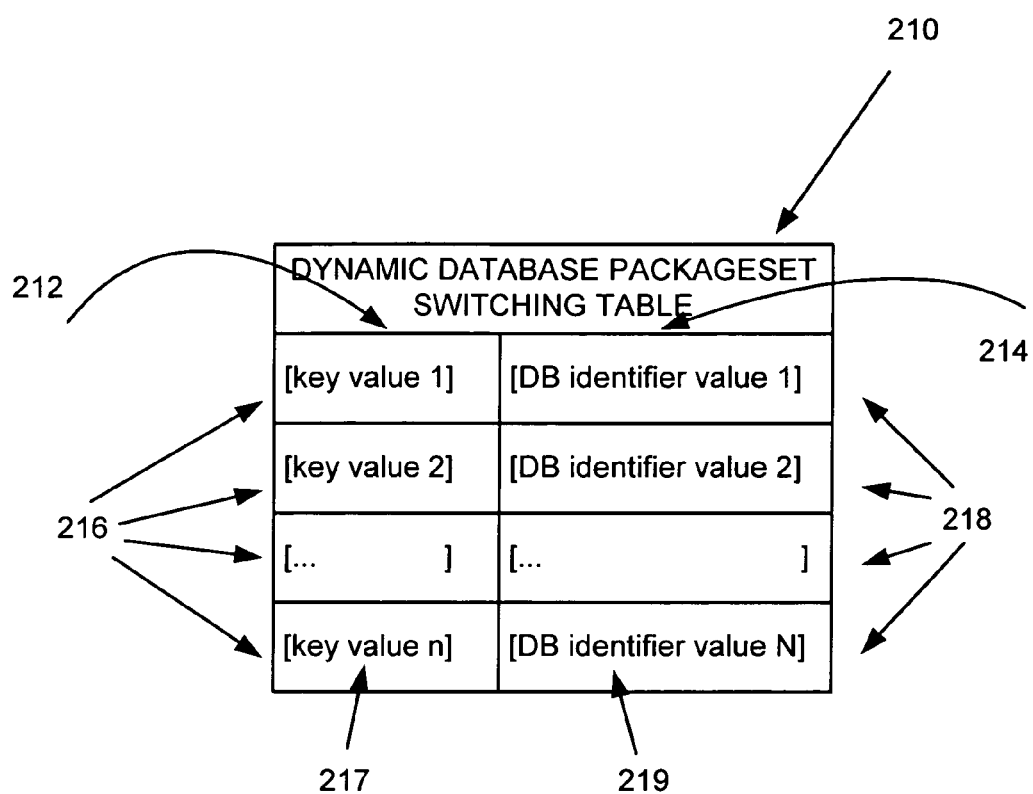
FIG. 15 illustrates one embodiment of a dynamic database packageset switching table in an FSO system.

In one embodiment, each row 172 in table 170 holds one key value and its associated database identifier value. In one embodiment, each key value is unique among the key values in the dynamic database packageset switching table. Each key definition is associated with one database identifier value in the dynamic database packageset switching table. A key value may be constructed from the key element values stored in the one or more key elements defined in the key definition for this dynamic database packageset switching table. In this example, the key values are constructed from key elements X (175), W (176), and Z (177), as defined in key description 150 illustrated in FIG. 14. In FIG. 15, row 1's key value is (12, VIS, Y). The database identifier value corresponding to the key value of (12, VIS, Y) is NN1234567890123456. Searching the dynamic database packageset switching table 170 for the key value of (12, VIS, Y) will return the database identifier value of NN1234567890123456.

FIG. 15—One Embodiment of a Dynamic Database Packageset Switching Table in an FSO System FIG. 15 illustrates one embodiment of the dynamic database packageset switching table 210 in an FSO system database. Dynamic database packageset switching table 210 may include cells 216 for storing user-defined key values 217 in one column 212 and cells 218 for storing user-defined database identifier values 218 in a second column 214. One row in each table may include one cell 216 for storing a user-defined key value 217 and one cell 218 for storing the user-defined database identifier value 219 associated with the key value. In this example, in Dynamic database packageset switching table, user defined key values (1, 2, . . . , n) correlate to database identifiers (1, 2, . . . , n).

In one embodiment, cells 216 for storing key values 217 may be of a pre-configured fixed size that is identical for all dynamic database packageset switching tables 210. In this embodiment, the fixed size of cells 216 may be pre-configured large enough to store key values 217 of the maximum size anticipated by the user of the system. In one embodiment, if the pre-configured size of cells 216 is not large enough, the dynamic database packageset switching tables may be re-configured with a larger fixed size for cells 216.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method performed in a Financial Service Organization (FSO) computer system, the method comprising:
    building a first key value from one or more data element values stored in a first memory in the FSO computer system;
    comparing the first key value to one or more key values stored in a second memory, the second memory comprising one or more database identifier values each corresponding to a respective key value of the one or more key values, the one or more key values and the one or more database identifier values stored in the second memory being entered by a user of the FSO computer system during a configuration of the FSO computer system;
    writing into a third memory a first database identifier value of the one or more database identifier values stored in the second memory in response to finding a match between the first key value and one of the one or more key values stored in the second memory, the first database identifier value comprising a pointer to a database location in a first database; and
    accessing the first database in response to writing the first database identifier value corresponding to the matching key value into the third memory, wherein accessing the first database comprises using the pointer associated with the first database identifier value to access a database location that is pointed to by the pointer.

2. The method of claim 1, wherein the FSO computer system comprises a plurality of databases, wherein the plurality of databases includes the first database, wherein each of the plurality of databases corresponds to a respective database identifier value, wherein one of the plurality of databases is an active database, wherein an active database identifier value corresponding to the active database is stored in a fourth memory, wherein the accessing the first database in response to writing the first database identifier value into the third memory comprises:
    comparing the first database identifier value in the third memory to the active database identifier value in the fourth memory; and
    setting the active database to the first database in response to the first database identifier value in the third memory not matching the active database identifier value in the fourth memory.

3. The method of claim 2, wherein setting the active database to the first database comprises setting the active database identifier value stored in the fourth memory to the first database identifier value from the third memory.

4. The method of claim 1, wherein the FSO computer system comprises a key definition comprising one or more data elements, wherein the first key value comprises one or more key fields, wherein the building the first key value from one or more data element values in the first memory in the FSO computer system comprises:
    reading a first data element value from the first memory, wherein a location of the first data element value in the first memory is defined by a first data element from the key definition; and
    storing the first data element value in a first key field in the first key value in response to reading the first data element from the first memory.

5. The method of claim 1, wherein the one or more key values and the one or more database identifier values stored in the second memory are entered by a user of the FSO computer system during initial set up of the FSO computer system for processing software transactions.

6. The method of claim 1, wherein the one or more key values and the one or more database identifier values stored in the second memory are entered by a user of the FSO computer system during reconfiguration of the FSO computer system.

7. A computer readable medium comprising program instructions, wherein the program instructions are executable by a FSO computer system to implement:
   building a first key value from one or more data element values stored in a first memory in the FSO computer system;
   comparing the first key value to one or more key values stored in a second memory, the second memory comprising one or more database identifier values each corresponding to a respective key value of the one or more key values the one or more key values and the one or more database identifier values stored in the second memory being entered by a user of the FSO computer system during a configuration of the FSO computer system;
   writing into a third memory a first database identifier value of the one or more database identifier values stored in the second memory in response to finding a match between the first key value and one of the one or more key values stored in the second memory, the first database identifier value comprising a pointer to a database location in a first database; and
   accessing the first database in response to writing the first database identifier value corresponding to the matching key value into the third memory, wherein accessing the first database comprises using the pointer associated with the first database identifier value to access a database location that is pointed to by the pointer.

8. The computer readable medium of claim 7, wherein the FSO computer system comprises a plurality of databases, wherein the plurality of databases includes the first database, wherein each of the plurality of databases corresponds to a respective database identifier value, wherein one of the plurality of databases is an active database, wherein an active database identifier value corresponding to the active database is stored in a fourth memory, wherein the accessing the first database in response to writing the first database identifier value into the third memory comprises:
   comparing the first database identifier value in the third memory to the active database identifier value in the fourth memory; and
   setting the active database to the first database in response to the first database identifier value in the third memory not matching the active database identifier value in the fourth memory.

9. The computer readable medium of claim 7, wherein setting the active database to the first database comprises setting the active database identifier value stored in the fourth memory to the first database identifier value from the third memory.

10. The computer readable medium of claim 7, wherein the FSO computer system comprises a key definition comprising one or more data elements, wherein the first key value comprises one or more key fields, wherein the building the first key value from one or more data element values in the first memory in the FSO computer system comprises:
   reading a first data element value from the first memory, wherein a location of the first data element value in the first memory is defined by a first data element from the key definition; and
   storing the first data element value in a first key field in the first key value in response to reading the first data element from the first memory.

11. The computer readable medium of claim 7, wherein the carrier medium is a memory medium.

12. A system for processing FSO transactions, the system comprising:
   a computer program;
   an FSO computer system;
   wherein the computer program is executable on the FSO computer system to execute:
   building a first key value from one or more data element values stored in a first memory in the FSO computer system;
   comparing the first key value to one or more key values stored in a second memory, the second memory comprising one or more database identifier values each corresponding to a respective key value of the one or more key values, the one or more key values and the one or more database identifier values stored in the second memory being entered by a user of the FSO computer system during a configuration of the FSO computer system;
   writing into a third memory a first database identifier value of the one or more database identifier values stored in the second memory in response to finding a match between the first key value and one of the one or more key values stored in the second memory, the first database identifier value comprising a pointer to a database location in a first database; and
   accessing the first database in response to writing the first database identifier value corresponding to the matching key value into the third memory, wherein accessing the first database comprises using the pointer associated with the first database identifier value to access a database location that is pointed to by the pointer.

13. The system of claim 12, wherein the FSO computer system comprises a plurality of databases, wherein the plurality of databases includes the first database, wherein each of the plurality of databases corresponds to a respective database identifier value, wherein one of the plurality of databases is an active database, wherein an active database identifier value corresponding to the active database is stored in a fourth memory, wherein the accessing the first database in response to writing the first database identifier value into the third memory comprises:
   comparing the first database identifier value in the third memory to the active database identifier value in the fourth memory; and
   setting the active database to the first database in response to the first database identifier value in the third memory not matching the active database identifier value in the fourth memory.

14. The system of claim 13, wherein setting the active database to the first database comprises setting the active database identifier value stored in the fourth memory to the first database identifier value from the third memory.

15. The system of claim 12, wherein the FSO computer system comprises a key definition comprising one or more data elements, wherein the first key value comprises one or more key fields, wherein the building the first key value from one or more data element values in the first memory in the FSO computer system comprises:
   reading a first data element value from the first memory, wherein a location of the first data element value in the first memory is defined by a first data element from the key definition; and
   storing the first data element value in a first key field in the first key value in response to reading the first data element from the first memory.

* * * * *

UNITED STATES PATENT AND TRADEMARK OFFICE
CERTIFICATE OF CORRECTION

PATENT NO.         : 7,363,264 B1                                      Page 1 of 1
APPLICATION NO. : 09/699058
DATED              : April 22, 2008
INVENTOR(S)        : Doughty et al.

It is certified that error appears in the above-identified patent and that said Letters Patent is hereby corrected as shown below:

In the Claims:

Claim 7, col. 17, line 16, please delete "more key values the one" and substitute therefor --"more key values, the one"--.

Signed and Sealed this

Fifth Day of August, 2008

JON W. DUDAS
*Director of the United States Patent and Trademark Office*